(12) United States Patent
Geldmacher

(10) Patent No.: US 8,400,773 B2
(45) Date of Patent: Mar. 19, 2013

(54) MOBILE ACTUATING DEVICE

(75) Inventor: Alexander Geldmacher, Wuppertal (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 713 days.

(21) Appl. No.: 12/373,386

(22) PCT Filed: Jun. 29, 2007

(86) PCT No.: PCT/EP2007/056550
§ 371 (c)(1), (2), (4) Date: Jul. 7, 2009

(87) PCT Pub. No.: WO2008/006710
PCT Pub. Date: Jan. 17, 2008

(65) Prior Publication Data
US 2009/0310327 A1    Dec. 17, 2009

(30) Foreign Application Priority Data
Jul. 10, 2006  (DE) .......................... 10 2006 032 060

(51) Int. Cl.
H05K 5/00 (2006.01)
H05K 7/00 (2006.01)
B41J 5/00 (2006.01)

(52) U.S. Cl. ........ 361/730; 361/731; 361/732; 361/733; 361/679.08; 361/679.09; 361/679.17; 400/490; 400/488

(58) Field of Classification Search ............. 361/679.08, 361/679.09, 679.17, 679.56; 400/490, 682, 400/488, 691, 491.2, 495, 495.1, 496; 428/12, 428/813–816, 41.7–41.9; 341/176, 22
See application file for complete search history.

(56) References Cited

U.S. PATENT DOCUMENTS
5,717,429 A * 2/1998 Coulon et al. ................ 345/168
(Continued)

FOREIGN PATENT DOCUMENTS
DE  19716064   10/1998
DE  19915969   11/1999
(Continued)

OTHER PUBLICATIONS
International Search Report PCT/EP2007/056550; Dated Oct. 16, 2007.
(Continued)

Primary Examiner — Jayprakash N Gandhi
Assistant Examiner — Jerry Wu
(74) Attorney, Agent, or Firm — Cantor Colburn LLP

(57) ABSTRACT

A mobile actuating device including a two shell housing, an interior chamber delimited by the shells, an electronic unit for data communication, an actuating member inside an opening of the first shell, a gap between the actuating member and the first shell, a carrier element, and a switching element connected to the electronic unit and associated with the actuating member, wherein the first shell includes a display having an opening in the first shell from which a light signal is emitted, the carrier element being translucent and made of a first material having a low modulus of elasticity, wherein the opening is completely filled by the carrier element, which conducts the light signal through the opening, and wherein the actuating member is made out of a second material with a larger modulus of elasticity than the first material.

19 Claims, 3 Drawing Sheets

U.S. PATENT DOCUMENTS

| | | | |
|---|---|---|---|
| 6,462,291 B1 * | 10/2002 | Sachs | 200/302.2 |
| 6,621,446 B1 | 9/2003 | Chaillie | |
| 7,525,061 B2 | 4/2009 | Kobayashi et al. | |
| 2007/0199814 A1 * | 8/2007 | Kobayashi et al. | 200/520 |

FOREIGN PATENT DOCUMENTS

| | | |
|---|---|---|
| DE | 19964166 | 8/2001 |
| DE | 10304161 | 8/2003 |
| DE | 10315202 | 10/2004 |
| DE | 10359172 | 7/2005 |
| EP | 1465118 | 10/2004 |
| WO | WO2005093770 A1 | 6/2005 |

OTHER PUBLICATIONS

CN OA 200780026162.0 dated Aug. 31, 2011.

CN OA 200780026162.0 dtd May 3, 2012.

* cited by examiner

FIG.1
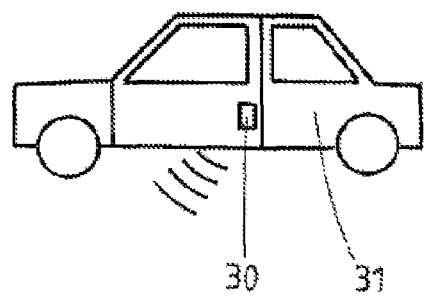
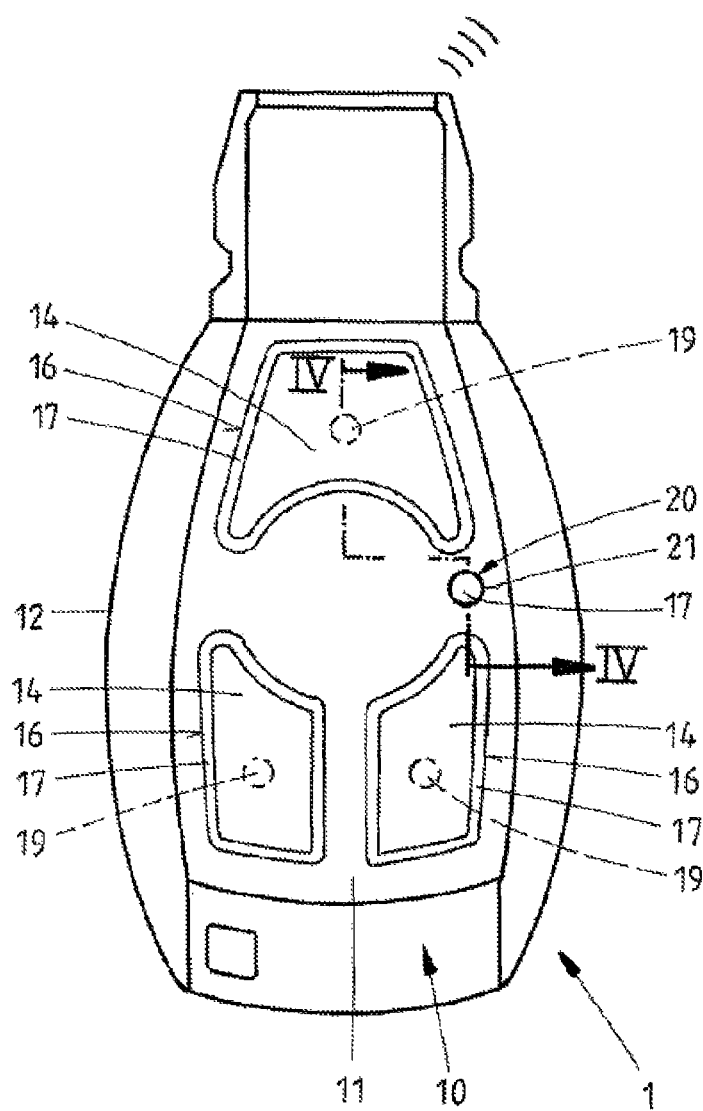

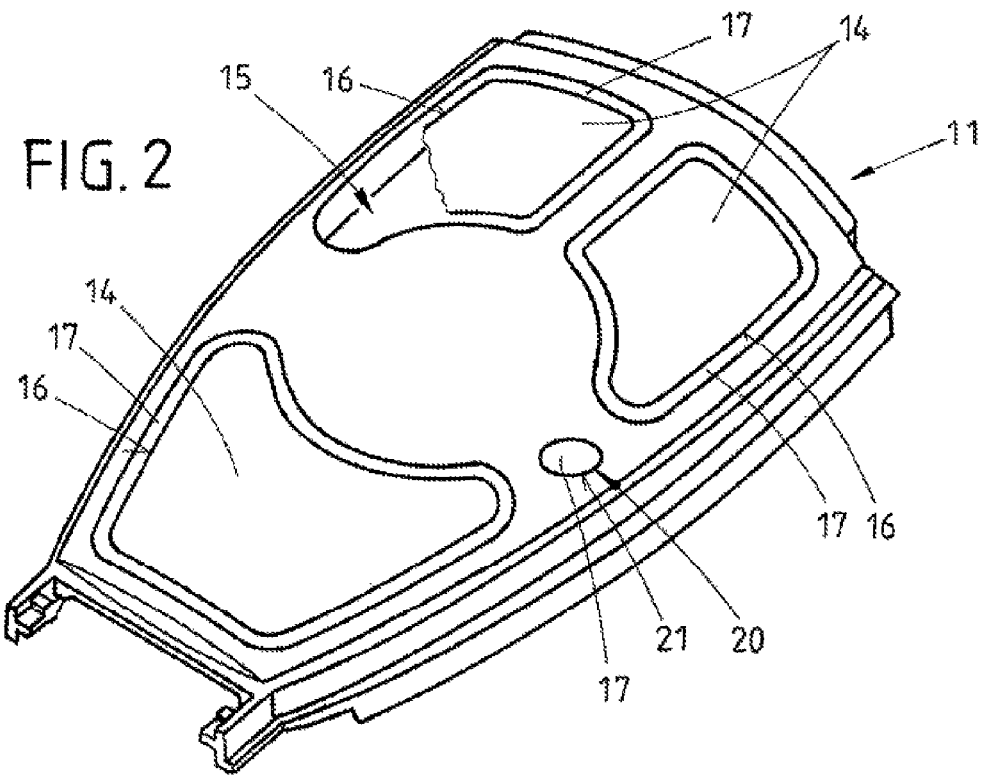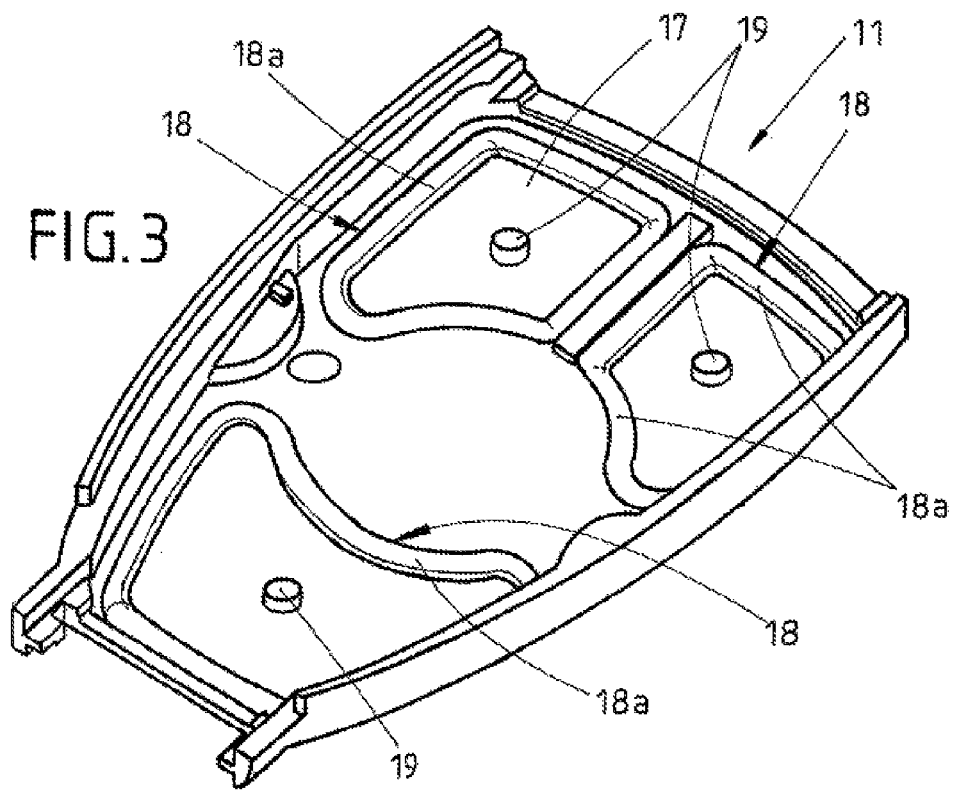

MOBILE ACTUATING DEVICE

FIELD OF THE INVENTION

The invention relates to a mobile actuating device, especially for remote operation of a locking system of a vehicle, with a housing having a first and second housing shell, an internal space, bounded at least partially by the housing shells, an electronic unit arranged at least partially within the internal space for data communication with the locking system, at least one operating element arranged within a housing opening of the first housing shell, a gap running between the operating element and the first housing shell, a support element provided on the side of the first housing shell facing the internal space, and a switch element connected to the electronic unit, which is connected to the operating element.

BACKGROUND OF THE INVENTION

Such mobile actuating devices are widely used in order to accommodate the electronics of a remote control on the user side, which can be designed as a transmitter a transmitter with a receiver, or a transponder. Such actuating devices can be designed, among other things, as key rings or as the handle of a mechanical key. An essential requirement for such mobile actuating devices is to protect the internal electronics from environmental effects, especially moisture and dirt, reliably. This requires special measures to seal the operating elements that are mounted so as to move.

A mobile actuating device having two housing shells, at least parts of which form an internal space accommodating an electronic unit, is described in DE 199 64 166 C1. A membrane-like sealing element is provided within the actuating device, which is inserted into the housing of the actuating device. The sealing element here is clamped in a gap existing between the housing shells. The housing shells form a closed internal space, whereby the sealing element separates the internal space into an upper and lower space. A circuit board is arranged in the lower space, having electronic elements, especially switch elements. Operating elements are also provided on the upper housing shell, which act with their lifters indirectly on the switch elements through the membrane-like sealing element. During operation of an operating element, the lifter is moved in the direction of the sealing element. On contacting the sealing element and with a corresponding force acting on the operating element, the switch element is also activated, whereby actuation of the actuating device is accomplished.

BRIEF SUMMARY OF THE INVENTION

The invention is based on the task of modifying a mobile actuating device of the above-mentioned type, in which the internal space is reliably protected from environmental effects, the actuating device can be produced cost-effectively, and increased demands relating to appearance and key touch properties are achieved. At the same time, a control capability with respect to method of function of the actuating device is to be made available simply to the user.

For this purpose, it is proposed according to the invention that the first housing shell has a display for optical depiction of information, especially in conjunction with the method of operation of the electronic unit and/or the state of the locking system, with an opening made in the first housing shell from which a light signal that can be generated within the housing can be emitted, whereby the support element, which is connected in one piece to the operating element, is designed to be transparent and is made of a first material with a limited modulus of elasticity, and the opening is completely filled up by at least part of the support element, so that the light signal can be guided outward through the support element, through the opening and the operating element, which is made of a second material, whereby the second material has a much greater modulus of elasticity than the first material.

The support element in the present invention lies directly on the side of the first housing shell facing the internal space, whereby it simultaneously assumes several functions. In the first place, the support element seals the internal space reliably, so that moisture, water, dust, etc., cannot reach the internal space, where it can adversely affect the electronic unit and its function. In the second place, the support element serves as a support means for the operating element. It has been found that by using the first material with a low modulus of elasticity, a responsive sense of touch is attainable in the user by operating the operating element, which consists of the second material having a much greater modulus of elasticity than the first material. Since the support element is arranged directly on the operating element, a compact design is simultaneously achieved. It is particularly advantageous that, for optical display of information, the support element acquires a type of guide function, so that the light signal generated within the actuating device is guided outward through the opening of the first housing shell. The display can be designed so that by operation of an operating element, the user can check whether the actuating device, especially the electronic unit, is functioning. When a light signal (for example, colored red) leaves the display, it means for the user that the actuating device is fully functional. The display can also convey optical information concerning the state of locking or unlocking of the locking system. It is conceivable to provide a state message about the locking system by multicolored light signals that leave the display. The displays can assume different geometric shapes. In one possible embodiment, the display can be a point-like surface. As an alternative to this, the display can be designed as a large-surface display accommodated by a corresponding opening of the first housing shell.

In a preferred embodiment of the invention, the first material of the support element has a modulus of elasticity E of $E<1000$ N/mm$^2$, preferably $E<500$ N/mm$^2$, more preferably $E<100$ N/mm$^2$, and especially $E<50$ N/mm$^2$. The support element is thus designed to be soft—elastic, whereas the second material from which the housing, the first housing shell, and the operating element are preferably made, is a harder plastic. In one possible configuration of the invention, the second material is a polyamide, a fiberglass-reinforced polyamide, ABS, etc. The first, soft material is preferably a thermoplastic elastomer, such as a copolymer. In order to guarantee good mobility of the operating element as well as to achieve suitable touch characteristics, the first material has a hardness H of $H<90$ Shore A, preferably $H<85$ Shore A, and more preferably $H<80$ Shore A.

It is particularly advantageous that the support element forms a one-part component with the first housing shell, including the operating element. In a first process step, the first housing shell is injected with the corresponding operating element made of the second plastic material. The die of the injection-molding machine is designed so that a peripheral gap is formed between the operating element and the first housing shell. In the next step, the support element is arranged directly on the first housing shell, especially on the operating element. A bond advantageously exists between the support element and the first housing shell. For example, the support element can be attached to the first housing shell by ultrasonic welding, laser welding, etc. In an advantageous embodiment, the first housing shell forms a two-component injection-molded component with the supporting element. This means that in the second process step, after the first housing shell has been formed in the injection-molding process, the support element is injection-molded onto the surface of the bottom of the housing shell. The support element is then situated unreleasably on the surface of the first housing shell, whereby access to the internal space of the actuating device from the outside through the peripheral gap is excluded.

In one possible embodiment of the mobile actuating device, the support element is only made transparent on one side, starting from the internal space out. This achieves a situation in which the internal space and the electronic unit are not recognizable from the outside through the peripheral gap. However, starting from the internal space, transmission of a light signal that has been generated outward within the actuator device is possible. One-sided transparency of the support element can be achieved by evaporation coating. The coated layer on the support element can be a thin metal layer.

The operating element can advantageously be brought from a rest position to an operating position by applying an external force, whereby the support element is designed so that in the operating position, a restoring force acts starting from the support element, which brings the operating element back to its rest position. It is particularly advantageous that in the operating position of the operating element, a restoring force is formed only from the support element, which brings the operating element with the support element back to the rest position. In one possible embodiment of the actuating device, the support element has a camber directed toward the internal space along the peripheral gap. This camber favors the restoring force of the support element that develops in the operating position of the operating element. The camber also means that lengthening of the control path of the operating element from its rest position into the operating position can be achieved. A light element is appropriately assigned to the opening, whereby the support element is situated between the opening and the light element. The light element can be an LED.

In another advantageous embodiment of the actuating device, the support element can be an organic LED (OLED), which is constructed in several layers and has an organic, light-emitting layer between two electrode layers. In this embodiment, the support element itself is the light element that can emit light by application of a voltage and/or a current. It is particularly advantageous that the organic LED is configured to be very thin and flexible. One electrode layer is appropriately designed as an anode and the other electrode layer as a cathode. A support element designed as an organic LED can also include other layers. In this embodiment, the support element is advantageously laser-welded to the first housing shell. Other bonds are also conceivable, such as an adhesive bond.

The support element appropriately has a head area accommodated by the opening. The opening of the first housing shell is advantageously completely filled by the head area of the support element. If light is generated in the actuating device, it passes through the head area and leaves the display outward. Since the head area fully closes the opening, there is no danger that any dirt particles, water, moisture, etc., can reach the internal space of the actuating device through the display.

A step that improves the invention can prescribe that a protrusion made on the side of the support element facing the internal space is provided that contacts the switch element in the operating position of the operating element. The protrusion acts as a type of lifter that activates the switch element in the operating position of the operating element. Special touch properties for the user can be achieved thereby.

BRIEF DESCRIPTION OF THE DRAWINGS

Additional advantages, features, and details of the invention can be seen from the following description, in which embodiment examples of the invention are described in detail with reference to the drawings. The features mentioned in the claims and in the description can be significant to the invention individually or in any combination. In the drawings:

FIG. 1 shows a top view of a mobile actuating device having a first housing shell with operating elements on the front, FIG. 2 shows the housing shell according to FIG. 1, in a three-dimensional side view, FIG. 3 shows the housing shell according to FIG. 2, in a three-dimensional bottom view.

DETAILED DESCRIPTION OF THE PREFERRED EMBODIMENTS

Figure 4:
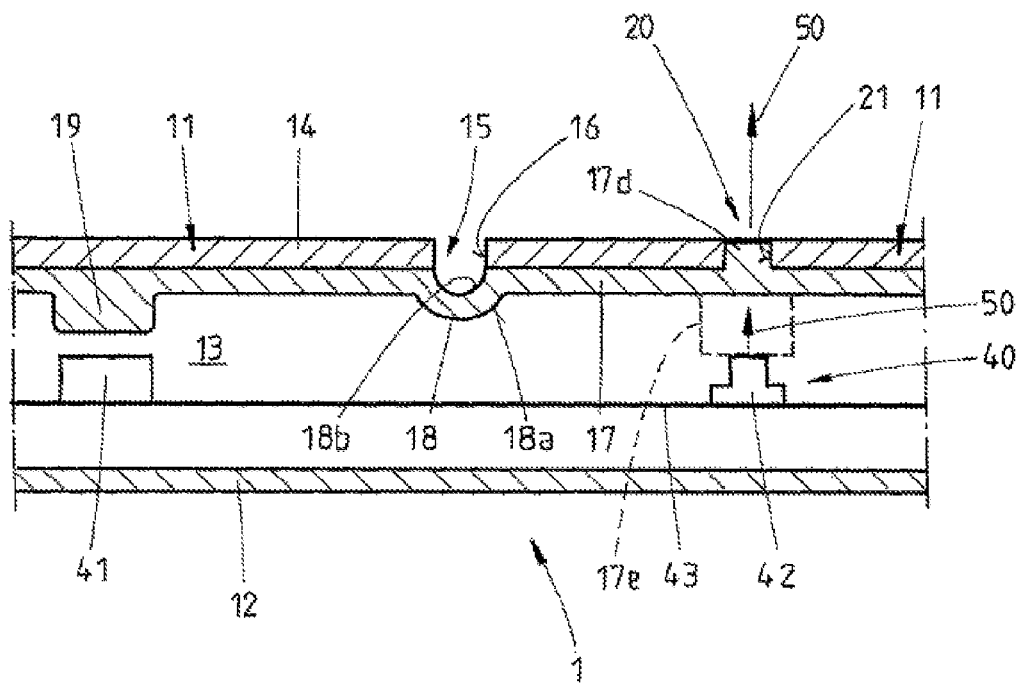
FIG. 4 shows a sectional view along IV-IV from FIG. 1.

A mobile actuating device 1 is shown in FIG. 1, which is used as an electronic key for remote control of a locking system 30 of a vehicle 31. The actuating device 1 has a housing 10 having a first 11 and a second housing shell 12. The second housing shell 12 is arranged on the back. The first housing shell 11 in the present embodiment example has three operating elements 14 arranged within a housing opening of the first housing shell 11. The housing opening 15 is shown here in FIG. 2. A peripheral gap 16 is situated between the first housing shell 11 and each operating element 14. The mobile actuating device also has an internal space 13, which is shown as an example in FIG. 4. The internal space 13 is bounded at least partially by the housing shells 11, 12, an electronic unit 40 being arranged within internal space 13 for data communication with the locking system 30. In the present example, the electronic unit 40 has a circuit board 43, onto which a switch element 41 and a light element 42 are attached.

A support element 17 is arranged on the side of the first housing shell 11, facing the internal space 13. The support element 17 here is connected in one piece to the first housing shell 11 and the operating element 14. The support element 17 and the first housing shell 11 form a two-component injection-molded part with the three operating elements 14. The support element 17 is also designed to be transparent and is made of a first material with a low modulus of elasticity.

As can be seen in FIG. 1 and FIG. 4, the first housing shell 11 is designed with a display 20 for showing optical information. The display 20 has an opening 21 formed in the first housing shell 11. A light signal 50 that can be generated within the housing 10 can be emitted from opening 21. In the present embodiment of the invention, the user can determine or check the extent to which the actuating device 1 is functional by operating one of the operating elements 14. If the actuating device 1 is in perfect operating condition, a light signal 50 is emitted outward from the display 20, which is readily visible to the user.

The opening 21, which is made circular in the embodiment example shown, is completely filled up by at least part of the support element 17. The support element 17 is made with a head area 17d, which completely fills up the opening 21 outward. Because of this, shape-matching of the support element 17 with the first housing shell 11 is additionally produced. The operating elements 14 can be brought from a rest position to an operating position by application of an external force, whereby the support element 17 in the operating position of the operating element 14 contacts the switch element 41, so that a light signal 50 leaves the light element in the direction of the display 20. A support element 17 with its head area 17d guides the coupled light signal 50 through opening 21 outward. The housing 10, especially the first housing shell 11 with the operating elements 14 are made from the second material, which has a much greater modulus of elasticity than the first material of the support element 17. An appropriate touch condition for the user during remote control of locking system 30 can be achieved by the hard operating elements 14 and the relatively soft support element 17.

It is particularly advantageous in the embodiment shown that the support element in the operating position of the operating element 14 permits a corresponding restoring force to be produced, so that the operating element 14 is brought back to its rest position. This is achieved, among other things, by a camber 18 along the peripheral gap 16 directed toward the internal space 13. According to FIG. 4, the camber 18 has an internal radius 18a, which is arranged on the side of the support element 17 facing the internal space 13, and an external radius 18b, arranged on the side of the support element 17 facing the operating element 14. In this case, two times the external radius 18b essentially corresponds to the width of the gap 16. As can be seen clearly, the external radius 18b is smaller than the internal radius 18a. Lengthening of the control path of the corresponding operating element 14 is also achieved by this bellows-like configuration in the form of a camber 18.

According to FIG. 4, a protrusion 19 made on the side of the support element 17 facing the internal space 13 is provided, which contacts the switch element 41 in the operating position of the operating element 14. This and additional protrusions 19 which have a cylindrical shape, can also be seen clearly in FIG. 3. In order to bring the operating element 14 from its rest position to its operating position, an external force is necessary, which in the present embodiment example is between $2 N \leq K \leq 15 N$, preferably between $3 N \leq K \leq 7 N$.

As shown by FIG. 3, in particular, the first housing shell 11 has only a single support element 17 on its bottom, which is connected in one piece to all three operating elements 14. Support element 17 here reliably seals the internal space 13 from the outside. Introduction of dirt, moisture, etc., through opening 21 and through the peripheral gap 16 is excluded according to FIG. 1 or FIG. 4.

In the embodiment shown in FIG. 4, the switch element 41 is designed as a microswitch. The microswitch 41 has a housing into which a snap-in disk can be integrated. Additional alternative switch elements are also possible. The light element 42 is an LED arranged beneath opening 21 in order to emit light 50 outward through opening 21 without losses, as efficiently as possible.

Another alternative is shown in FIG. 4, which has a light-guide area 17e connected in one piece as a material unit to the support element 17. The light-guide area 17e extends to light element 42. Whereas light element 42 emits light signals 50 in the direction of display 20, almost all light signals 50 are coupled into the light-guide area 17e, through which the light guide 17e guides the light signals 50 in the direction of head area 17d, so that only very limited light losses develop. The refractive index of the support element 17, especially the light-guide area 17e, is much greater here than the refractive index of the internal space 13 enclosing the light-guide area 17e. Light element 42 is advantageously in contact at its free end with the light-guide area lie. Connection of light element 42 to the light-guide area 17e by an adhesive is also conceivable, whereby the refractive index of the adhesive advantageously almost corresponds to the refractive index of the support element 17. In another embodiment of the invention, there is also the possibility that there is a spacing between the light element 42 and the light-guide area 17e.

The first material of the support element 17 can be made almost 100% transparent. In certain applications, however, it is preferred that only partial transparency of the support elements 17 exists, in order to hamper recognition of the internal space 13 from the outside, especially the electronic components of electronic unit 40. In this case, the support element 17 can be made milky. In another alternative, the support element 17 is only transparent on one side, starting from the internal space 13 outward.

The width of gap 16, which is shown in FIG. 1, FIG. 2, and FIG. 4, is $0.1 mm \leq B \leq 2 mm$, preferably $0.5 mm \leq B \leq 1 mm$, and more preferably $0.6 mm \leq B \leq 0.9 mm$.

Figure 5:
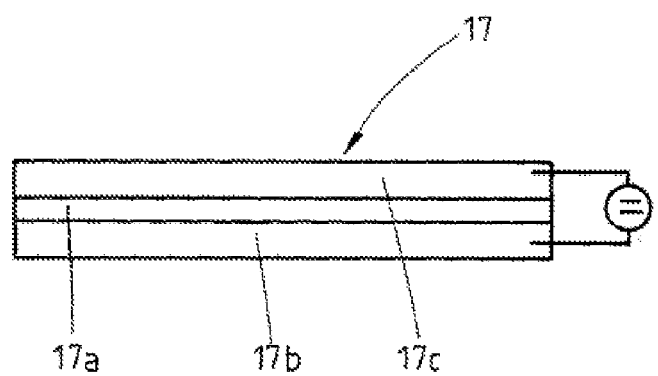
FIG. 5 shows another embodiment of the mobile actuating device, in which a support element constructed in several layers is provided.

Another embodiment of the support element 17 is shown in FIG. 5, which is designed as an OLED constructed in several layers. The thickness of the support element 17 in the present embodiment example lies in between 0.4 mm and 0.8 mm. The OLED has a light-emitting layer 17a, arranged between the electrode layers 17b, 17c. When a voltage is applied, the OLED generates light that can proceed outward through the display 20 according to FIG. 4. The OLED is shown purely schematically here, which is designed as a very thin flexible support element 17. In addition to the sealing and supporting function for the operating element 14, the support element 17 is simultaneously the light element for the display 20. In a embodiment not shown, configuring the display 20 as a large-surface display can be appropriate, in order to provide more than just a point-like light signal for showing information optically. In this case, a support element 17 designed as an OLED offers particular advantages.

The invention claimed is:
1. A mobile actuating device comprising:
a housing having a first and a second housing shell;
an internal space bounded at least partially by the housing shells;
an electronic unit arranged at least partially within the internal space for data communication with locking system;
at least one operating element arranged within a housing opening of the first housing shell;
a peripheral gap between the operating element and the first housing shell;
a support element provided on a side of the first housing shell facing the internal space;
and a switch element connected to the electronic unit assigned to the operating element,
wherein the first housing shell has a display for showing optical information with an opening made in the first housing shell, from which a light signal that can be generated within housing can be emitted,
whereby the support element, which is connected in one piece to the operating element, is transparent and made from a first material with a low modulus of elasticity, and the opening is completely filled up by at least a part of the support element, so that the light signal can be guided outward through opening through the support element and the operating element, which is made from a second material that has a much greater modulus of elasticity than the first material, wherein the first housing shell and the support element form a one-part component, which is a two-component injection-molded part.

2. A mobile actuating device according to claim 1, wherein the first material of the support element has a modulus of elasticity E of E <1000 N/mm$^2$.

3. A mobile actuating device according to claim 1, wherein the first material of the support element has a hardness H of H <90 Shore A.

4. A mobile actuating device according to claim 1, wherein the support element is only transparent on one side, starting from the internal space outward.

5. A mobile actuating device according to claim 1, wherein the operating element can be brought from a rest position to an operating position by applying an external force, whereby the support element is designed so that in the operating position, a restoring force is produced starting from the support element, which brings the operating element back into its rest position.

6. A mobile actuating device according to claim 5, wherein an external force K of 2 N$\leq$K$\leq$15 N is sufficient to bring the operating element from its rest position to the operating position.

7. A mobile actuating device according to claim 1, wherein the first material is a thermoplastic elastomer.

8. A mobile actuating device according to claim 1, wherein the support element has a camber directed toward the internal space along the peripheral gap.

9. A mobile actuating device according to claim 8, wherein the camber has an internal radius arranged on a side of the support element facing the internal space and an external radius arranged on a side of the support element facing the operating element.

10. A mobile actuating device according to claim 9, wherein two times the external radius essentially corresponds to a width of the peripheral gap.

11. A mobile actuating device according to claim 9, wherein the external radius is smaller than the internal radius.

12. A mobile actuating device according to claim 1, wherein the width B of the peripheral gap is 0.1 mm$\leq$B$\leq$2 mm.

13. A mobile actuating device according to claim 1, wherein a light element is assigned to the opening, whereby the support element is situated between the opening and a light element.

14. A mobile actuating device according to claim 1, wherein the support element is an organic LED designed in several layers and has an organic light-emitting layer between two electrode layers.

15. A mobile actuating device according to claim 1, wherein the electronic unit has a circuit board, on which at least one of the switch element and a light element are arranged.

16. A mobile actuating device according to claim 1, wherein the support element includes a head area accommodated by the opening.

17. A mobile actuating device according to claim 16, wherein a light-guide area is designed as a protrusion on a side of the support element facing away from the head area.

18. A mobile actuating device according to claim 1, wherein a protrusion is made on a side of the support element facing the internal space, which contacts the switch element in an operating position of the operating element.

19. A mobile actuating device according to claim 1, wherein the support element is connected to several operating elements made on the first housing shell.

\* \* \* \* \*